(12) United States Patent
Halischuk (10) Patent No.: US 11,944,033 B2
(45) Date of Patent: Apr. 2, 2024

(54) ATTACHMENT FOR USE WITH A PRIME MOVER TO CUT GROUND MATERIAL

(71) Applicant: Corrie Halischuk, Clandeboye (CA)

(72) Inventor: Corrie Halischuk, Clandeboye (CA)

( * ) Notice: Subject to any disclaimer, the term of this patent is extended or adjusted under 35 U.S.C. 154(b) by 268 days.

(21) Appl. No.: 17/226,169

(22) Filed: Apr. 9, 2021

(65) Prior Publication Data

US 2021/0400868 A1 Dec. 30, 2021

Related U.S. Application Data

(60) Provisional application No. 63/029,834, filed on May 26, 2020.

(51) Int. Cl.
*A01D 34/66* (2006.01)
*A01B 21/08* (2006.01)

(52) U.S. Cl.
CPC ............ *A01D 34/662* (2013.01); *A01B 21/08* (2013.01)

(58) Field of Classification Search
CPC .. A01D 34/662; A01D 34/661; A01D 34/664; A01D 34/42; A01D 34/43; A01D 34/44; A01D 2023/026; A01D 45/00; A01D 59/048; A01B 21/08; A01B 21/083; A01B 21/086; A01B 21/00; A01B 21/04
See application file for complete search history.

(56) References Cited

U.S. PATENT DOCUMENTS

| 1,074,460 | A | * | 9/1913 | Pohl | E02F 3/961 |
| | | | | | 172/438 |
| 2,319,458 | A | * | 5/1943 | Hornish | A01B 21/08 |
| | | | | | 172/580 |
| 2,538,594 | A | * | 1/1951 | Rutter | A01B 21/08 |
| | | | | | 172/156 |
| 2,608,040 | A | * | 8/1952 | Brunt | A01B 21/08 |
| | | | | | 172/581 |
| 2,641,884 | A | * | 6/1953 | Sawyer | A01B 21/08 |
| | | | | | 172/583 |
| 2,771,729 | A | * | 11/1956 | Wirsig | A01B 21/08 |
| | | | | | 172/240 |
| 2,798,419 | A | * | 7/1957 | Moriceau | A01B 21/08 |
| | | | | | 172/600 |
| 2,910,128 | A | * | 10/1959 | Giles | A01B 51/00 |
| | | | | | 172/591 |
| 3,050,927 | A | * | 8/1962 | Kessler | A01D 34/42 |
| | | | | | 56/294 |

(Continued)

*Primary Examiner* — Abigail A Risic
(74) *Attorney, Agent, or Firm* — Adrian D. Battison; Ade & Company Inc.; Ryan W. Dupuis (57) ABSTRACT

An attachment with cutting discs for use with a prime mover to cut ground material comprises a frame with forward and rear ends, a mounting portion at the rear end which is configured for coupling to a pivotal mounting member of the prime mover which is carried at forward ends of pivotal arms of the prime mover that can be raised or lowered, and a cutting portion at the forward end of the frame comprising a single transversely extending row of cutting discs arranged to cut the ground material in a forward working direction of movement of the prime mover. The single row of cutting discs is spaced from the mounting portion at a prescribed distance of about 4.5-5.5 feet such that cantilever action of the row of discs about the mounting member provides effective cutting action. The attachment includes shields covering the cutting discs.

24 Claims, 10 Drawing Sheets

(56) References Cited

U.S. PATENT DOCUMENTS

| | | | | |
|---|---|---|---|---|
| 3,090,447 A * | 5/1963 | Hotchkiss, Jr. | ......... | A01B 49/02 |
| | | | | 172/198 |
| 3,090,448 A * | 5/1963 | Hotchkiss, Jr. | ...... | A01B 23/046 |
| | | | | 172/489 |
| 3,417,826 A * | 12/1968 | Jackson | ................. | A01B 21/08 |
| | | | | 172/591 |
| 3,461,972 A * | 8/1969 | McKay | ................. | A01B 73/005 |
| | | | | 172/240 |
| 4,291,770 A * | 9/1981 | Engler | ................. | A01B 21/083 |
| | | | | 172/185 |
| 4,327,932 A * | 5/1982 | Anderson | ............. | A01B 21/08 |
| | | | | 172/311 |
| 4,595,064 A * | 6/1986 | Anderson | ............. | A01B 35/18 |
| | | | | 172/178 |
| 4,848,068 A * | 7/1989 | Staffanson | ............. | A01D 34/86 |
| | | | | 56/12.7 |
| 4,878,338 A * | 11/1989 | Aldred | ................... | A01D 34/42 |
| | | | | 56/DIG. 15 |
| 4,892,155 A * | 1/1990 | Wanamaker | .......... | E02F 3/3414 |
| | | | | 172/199 |
| 5,873,417 A * | 2/1999 | Halischuk | ............ | A01B 59/048 |
| | | | | 172/199 |
| 7,048,069 B1 * | 5/2006 | Bollich | ................. | A01B 21/086 |
| | | | | 172/147 |
| 2004/0245004 A1 * | 12/2004 | Ruckle | ................. | A01B 21/086 |
| | | | | 172/394 |
| 2021/0015036 A1 * | 1/2021 | Bergh | ................... | A01D 34/435 |
| 2022/0304213 A1 * | 9/2022 | Schroeder | ............ | A01B 23/046 |

* cited by examiner

FIG 1

ATTACHMENT FOR USE WITH A PRIME MOVER TO CUT GROUND MATERIAL

This application claims the benefit under 35 USC 119 (e) from provisional Application 63/029,834 filed May 26, 2020 the disclosure of which is incorporated herein by reference.

The present invention relates generally to an attachment for use with a prime mover to cut ground material such as for tillage or cultivation, and more particularly to such an attachment for use with a prime mover of the type having forwardly extending pivotal arms with a pivotal mounting member carried thereby and to which the attachment is attachable.

BACKGROUND

It is known for example from U.S. Pat. No. 5,873,417, which belongs to the Applicant, to mount an attachment for cutting ground material on a prime mover of the type having forwardly extending pivotal arms with a pivotal mounting member carried thereby, such as a conventional skid steer tractor.

SUMMARY OF THE INVENTION

According to an aspect of the invention there is provided a disker attachment for mounting on a skid-steer tractor to cut ground, the tractor having:

a frame having a front end, a rear end, and transversely opposite sides;

ground engaging members supported on the sides of the frame and arranged for moving the frame across a support surface in a forward working direction;

a pair of pivotal arms each supported on a different one of the sides of the frame for upward and downward movement relative to the frame about a transversely oriented pivot axis, the pivotal arms extending forwardly from rear ends at which the pivot axis is located to front ends of the pivotal arms located at or adjacent the front end of the frame; and a mounting member supported between the front ends of the pivotal arms relative to a transverse direction of the frame in a manner for pivotal movement about a generally horizontal axis extending between said front ends, the mounting member being configured to removably receive a work tool in a manner such that the work tool is movable therewith;

the disker attachment comprising:
a frame having a forward end and a longitudinally spaced rear end;
a mounting coupling at the rear end of the frame configured for coupling to the mounting member of the prime mover;
a set of cutting disks mounted at the front end of the frame in forwardly spaced relation to the mounting portion;
the set of cutting disks comprising only a single transversely-extending row of cutting discs across the front end of the frame;
the set of cutting disks comprising two sections arranged in a V-shape with an apex of the V-shape being located at the front and defining two rotation axes of the row diverging rearward from the apex, with each of the two sections of disks rotating about a respective rotation axis;
the set of cutting disks being fixed at the V-shape and arranged so as to carry cut material in an inward direction toward a center line.

Preferably a center of mass of the single row of cutting discs is longitudinally spaced from the mounting portion at a prescribed distance of about 4.5 feet to about 5.5 feet.

This provides a simple arrangement for a ground-cutting implement in which the row of cutting discs are arranged at a suitably spaced distance which provides effective and controllable cutting action. If the single row of cutting discs is located closer to the mounting portion than the prescribed distance, a weight of the front end of the attachment causes the cutting discs to dig too deeply into the ground material thereby impeding movement of the prime mover in the forward working direction. If the single row of cutting discs is located farther from the mounting portion than the prescribed distance, the weight of the front end of the attachment is insufficient to effect cutting engagement of the discs with the ground material.

In at least one arrangement the prescribed distance is about 5 feet.

Preferably, the attachment further includes a counterweight supported at the rear end of the frame and having a mass greater than that of the cutting portion.

Preferably, the mass of the counterweight is about 90 lbs to about 140 lbs greater than the mass of the cutting portion.

In one arrangement, the attachment further includes a levelling drag operatively supported on the frame rearwardly of the cutting portion and configured for levelling the cut ground material in the forward working direction.

When the cutting discs are dished such that an inner side of each disc, which is proximal to a transverse center of the frame, is concave and an outer side of each disc, which is distal to a transverse center of the frame, is convex such that the row of cutting discs acts to displace cut ground material inwardly, preferably the levelling drag comprises a transversely extending levelling bar defining a generally horizontal bottom plane and arranged for engaging the ground material, which is generally V-shaped with a leading apex so as to displace the cut ground material in an opposite direction to that effected by cutting action of the dished cutting discs upon movement in the forward working direction.

Preferably the levelling drag comprises a plurality of transversely extending levelling bars each defining a generally horizontal bottom plane and arranged for engaging the ground material, which are longitudinally spaced from each other.

Preferably the levelling drag comprises at least one transversely extending levelling bar arranged to be oriented transversely to the forward working direction and a support linkage interconnecting the at least one levelling bar and the frame which is movable upwardly and downwardly relative to the frame between a disengaged position in which the at least one levelling bar is located at or adjacent the frame and an engaged position in which the at least one levelling bar is located at a spaced height below the frame for engaging the ground material.

In one arrangement the support linkage includes a pair of arms pivotally operatively connected to each of the frame and the at least one levelling bar, which in the engaged position extend downwardly and rearwardly from the frame.

In one arrangement the support linkage includes a pair of flexible tensionable members depending from the frame and attached to the at least one levelling bar rearwardly of the arms of the support linkage.

When the levelling drag comprises a plurality of longitudinally spaced transversely-extending levelling bars arranged for engaging the ground material and defining a common bottom plane, optionally the levelling drag is configured to be movable between a flat position in which the plane of the levelling drag is generally horizontally oriented and a pitched position in which the plane of the levelling drag is inclined rearwardly and upwardly such that a rearmost one of the levelling bars is disposed above a forwardmost one of the levelling bars.

In one such arrangement, the levelling drag includes a trailing skid plate supported to lie in the common plane at a rearwardly spaced position behind the rearmost levelling bar, the skid plate being movable between an inactive position in which the skid plate is parallel to the plane of the levelling drag and an active position in which the skid plate is inclined relative to the plane of the levelling drag with a forward end of the skid plate located above a rear end thereof to effect movement of the levelling drag into the pitched position.

In the illustrated arrangement, the single row of cutting discs is arranged in a V-shape with a leading apex.

Preferably, in such an arrangement, the cutting discs are dished such that an inner side of each disc, which is proximal to the apex, is concave and an outer side of each disc, which is distal to the apex, is convex such that the cut ground material is displaced inwardly upon movement in the forward working direction.

In one arrangement, the cutting portion includes a plurality of shields supported above the cutting discs in spaced relation thereto and arranged to extend outwardly from the row to cover upper quadrant portions of the cutting discs.

Preferably, each shield is arcuate between an upper end which is coupled in generally fixed position to the frame and a lower free end in a manner corresponding to a circumference of the cutting disc thereunder.

Preferably, each shield is movable between a working position in which the shield extends outwardly and downwardly from the frame over the cutting disc thereunder and a raised position in which the shield extends generally upwardly.

Preferably, each shield is mounted to the frame independently of the other shields.

Preferably the set of cutting bisks is spaced from the mounting coupling by a distance of at least 4 feet so as to provide a cantilever action of the weight of die cutting disks reiatlye to the mounting coupling.

Preferably there is provided a counterweight member mounted on the frame at the rear end of the frame immediately adjacent the mounting coupling.

Preferably the weight of the counterweighs member mounted on the frame at the rear end of the frame immediately adjacent the mounting coupling and the distance of the set of cutting disks from the mounting coupling is arranged to pivot the frame so that the mounting coupling falls to the ground when released from the tractor.

Preferably the levelling drag comprises at least one bar having bottom cutting flanges extending forwardly and rearwardly from front and rear faces of the bar for engaging and cutting the ground.

Preferably the levelling drag comprises at least one bar having an opening which allows the bar to be filled with a filler material such as sand for increase weight.

Preferably the levelling drag is earned on cables so as to engage the ground under its own weight and so as to allow movements forward, rearwardly and to the sides to an extent limited by the cables.

Preferably each shield is removable by a release mechanism for use without the shields.

According to another aspect of the invention there is provided a disker attachment for mounting on a skid-steer tractor to cut ground, the tractor having:

a frame having a front end, a rear end, and transversely opposite sides;

ground engaging members supported on the sides of the frame and arranged for moving the frame across a support surface in a forward working direction;

a pair of pivotal arms each supported on a different one of the sides of the frame for upward and downward movement relative to the frame about a transversely oriented pivot axis, the pivotal arms extending forwardly from rear ends at which the pivot axis is located to front ends of the pivotal arms located at or adjacent the front end of the frame; and a mounting member supported between the front ends of the pivotal arms relative to a transverse direction of the frame in a manner for pivotal movement about a generally horizontal axis extending between said front ends, the mounting member being configured to removably receive a work tool in a manner such that the work tool is movable therewith;

the disker attachment comprising:
a frame having a forward end and a longitudinally spaced rear end;
a mounting coupling at the rear end of the frame configured for coupling to the mounting member of the prime mover;
a set of cutting disks mounted at the front end of the frame in forwardly spaced relation to the mounting portion;
the set of cutting disks comprising a transversely-extending row of cutting discs across the front end of the frame;
and a plurality of shields supported above the cutting disks in spaced relation thereto and arranged to extend outwardly from the row to cover upper quadrant portions of the cutting disks.

According to another aspect of the invention there is provided a disker attachment for mounting on a skid-steer tractor to cut ground, the tractor having:

a frame having a front end, a rear end, and transversely opposite sides;

ground engaging members supported on the sides of the frame and arranged for moving the frame across a support surface in a forward working direction;

a pair of pivotal arms each supported on a different one of the sides of the frame for upward and downward movement relative to the frame about a transversely oriented pivot axis, the pivotal arms extending forwardly from rear ends at which the pivot axis is located to front ends of the pivotal arms located at or adjacent the front end of the frame; and a mounting member supported between the front ends of the pivotal arms relative to a transverse direction of the frame in a manner for pivotal movement about a generally horizontal axis extending between said front ends, the mounting member being configured to removably receive a work tool in a manner such that the work tool is movable therewith;

the disker attachment comprising:
a frame having a forward end and a longitudinally spaced rear end;
a mounting coupling at the rear end of the frame configured for coupling to the mounting member of the prime mover;
a set of cutting disks mounted at the front end of the frame in forwardly spaced relation to the mounting portion;
the set of cutting disks comprising a transversely-extending row of cutting discs across the front end of the frame;

and a levelling drag operatively supported on the frame rearwardly of the cutting portion and configured for levelling the cut ground material in the forward working direction.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures show an attachment indicated at reference numeral 10 for use with a prime mover such as a conventional skid steer tractor 1 comprising a frame 2 having a front end 2A, a longitudinally opposite rear end 2B, and transversely opposite sides 2C, which is arranged for movement across a support surface in a forward working direction F by ground engaging members 3 in the form of wheels or tracks supported on either side 2C of the frame. The prime mover 1 further comprises a pair of forwardly extending arms 5, each one of which is supported on either side 2C of the frame for upward and downward pivotal movement relative to the frame about a transversely oriented pivot axis 6 located at rear ends 5A of the arms 5. The prime mover 1 further includes a mounting member 7 generally in the form of a plate which is pivotally supported at front ends 5B of the pivotal arms, in a manner interconnecting or bridging a space between the arms so as to be transversely intermediate the same, which ends 5B are located in front of the front end 2A of the frame for movement about a distinct generally horizontally oriented transversely extending pivot axis 9 that is movable upwardly and downwardly with the pivotal arms 5. The mounting member 7 is configured to removably receive different work tools in a manner such that each of the removably mounted work tools is movable therewith.

The attachment 10 is used for cutting or slicing ground material such as for tillage or cultivation.

Generally speaking, the attachment 10 comprises a frame 11 having a rear end 11A and a longitudinally spaced forward end 11B and transversely opposite sides 12. The frame 11 is defined primarily by a pair of parallel longitudinally extending beams 14 which are operatively interconnected by transversely extending front and rear cross members 15 and 16, as more clearly shown in FIG. 2. In the illustrated arrangement there is provided a secondary rear cross member 17 as will be better appreciated shortly.

Figure 1:
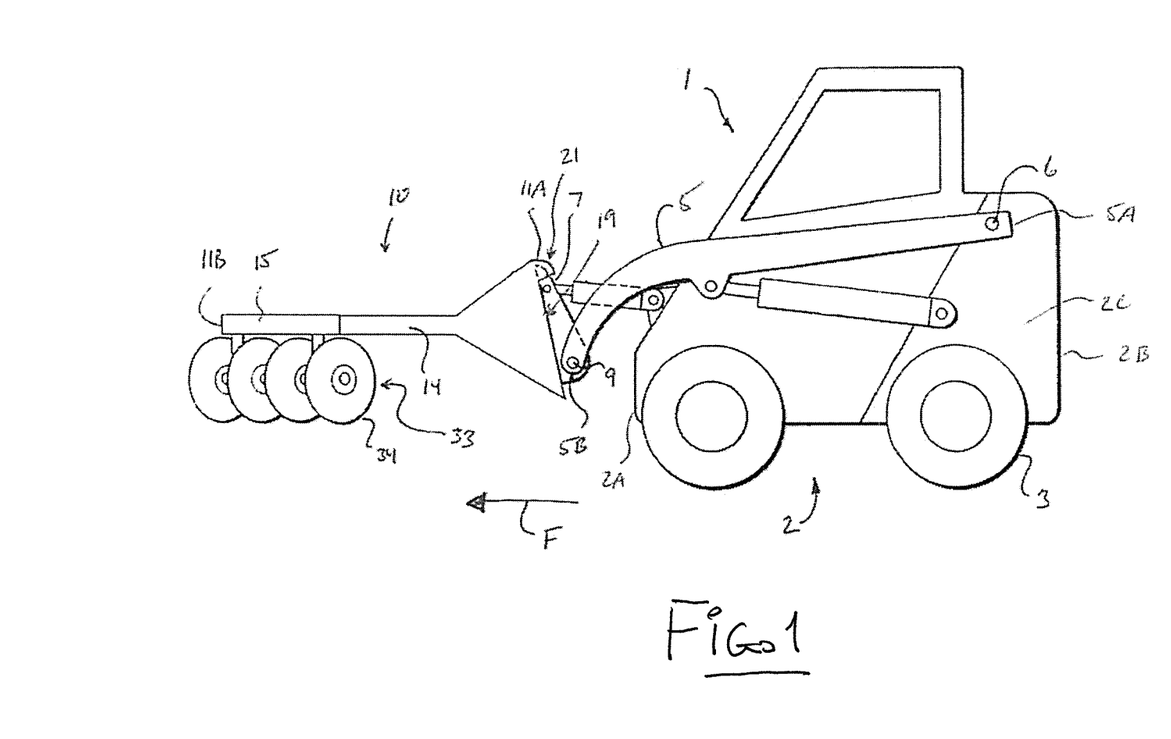
FIG. 1 is a side view schematically showing an attachment according to the present invention mounted on a skid steer tractor unit, where some components of the attachment are omitted for convenience and clarity of illustration.
Figure 2:
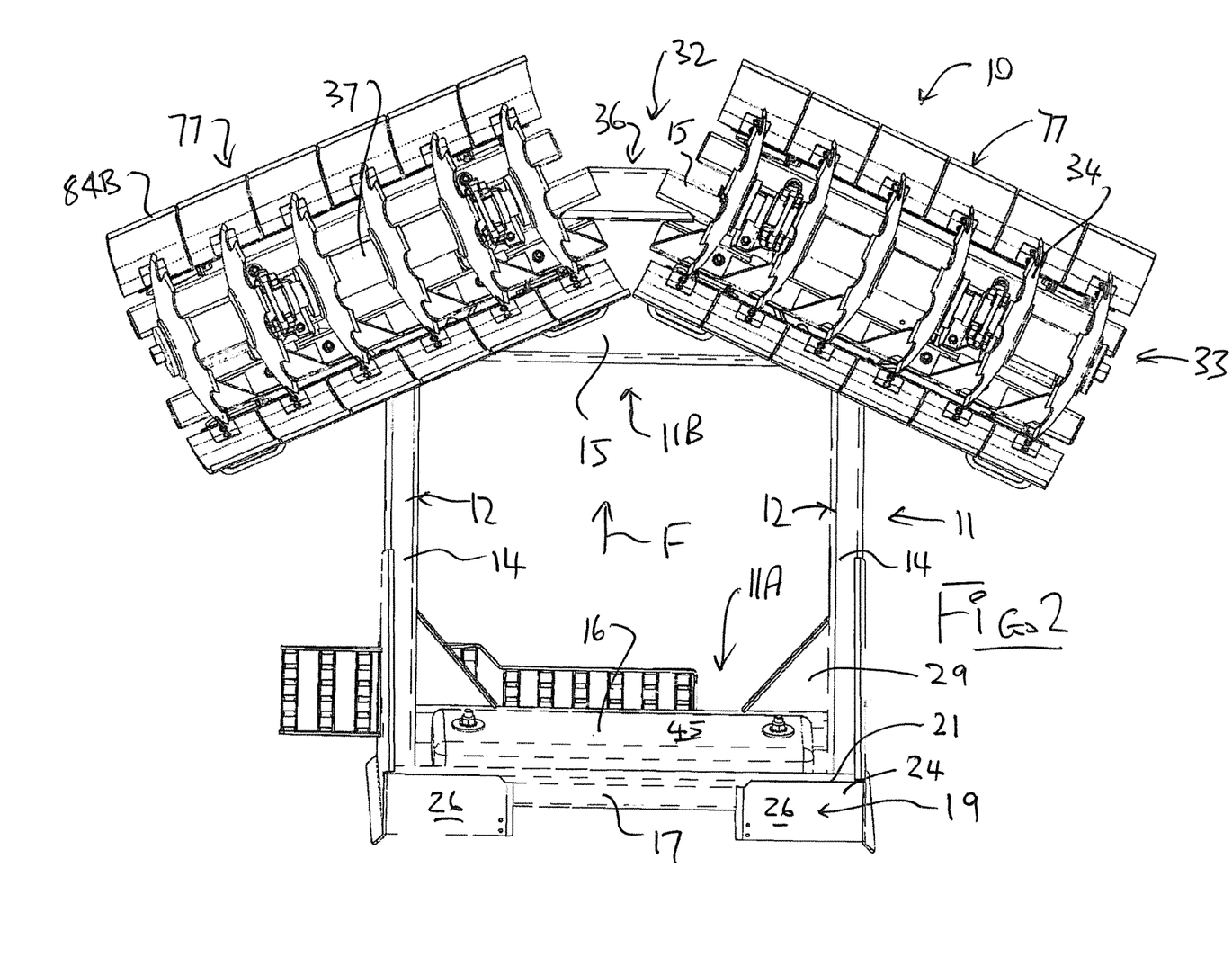
FIG. 2 is a bottom plan view of the attachment of FIG. 1, where some components are omitted for clarity of illustration.
Figure 3:
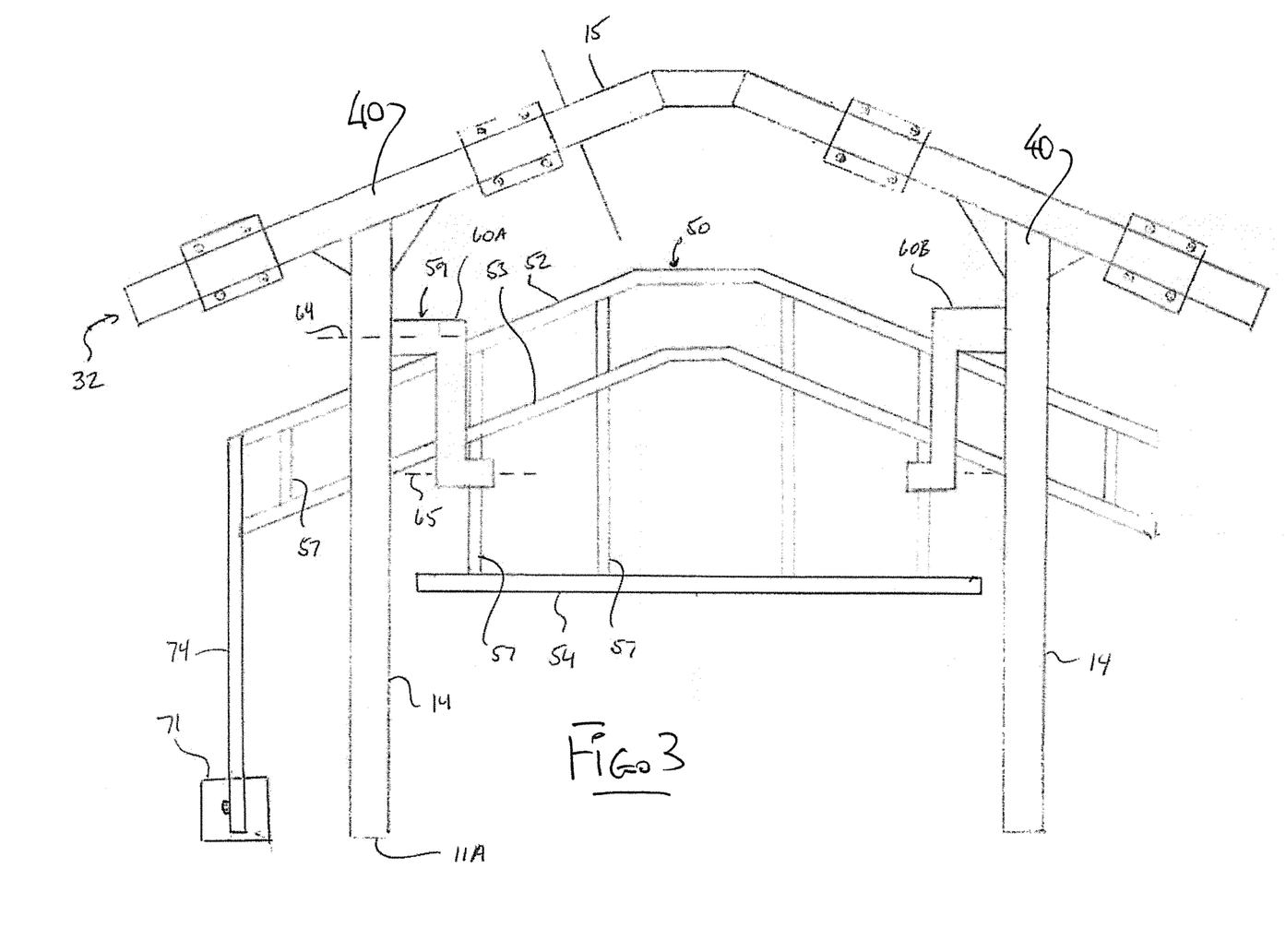
FIG. 3 is a plan view schematically showing the attachment of FIG. 1 including an additional drag bar carried underneath the frame of the attachment.

Referring to FIG. 2, at the rear end 11A the attachment has a mounting portion 19 which is configured for mounting on the mounting member 7 of the prime mover. The mounting portion 19 forms a receptacle 21 at a top thereof in the form of a channel that is configured for receiving an upper edge of the mounting member in intimate mating relation. The mounting portion 19 further includes a planar generally upright support surface 24 below the receptacle 21 for butting engagement with a forwardly-facing planar face of the mounting member 7. The channel and the support surface thus provide a mounting which allows pivotal movement of the attachment about the axis of the channel. This allows the attachment to be picked up from storage on the ground by the front mounting of the tractor. The abutment support surface 24 is provided by a pair of laterally spaced plates 26 which are oriented at an inclined angle to the vertical in a normal working orientation of the attachment 10 in which forwardly extending beams 14 which project forwardly from the mounting portion 19 are oriented generally horizontally. The beams 14 are located at central locations relative to heights of the plates 26 and thus gussets are provided to strengthen interconnection therebetween. The plates 26 are further supported by the pair of vertically spaced-apart cross beams 16, 17 attached thereto on surfaces opposite to that defining the abutment support surface 24 and which are attached to the gussets 29. The gussets act to interconnect the cross beams 16, 17 with the forward beams 14.

At the forward end 11B the attachment comprises a cutting portion 32 which is coupled in forwardly spaced relation to the mounting portion 19 by the beams 14 for performing a cutting action on the ground material. The cutting portion 32 comprises a single transversely-extending row 33 of cutting discs 34 which are arranged to cut the ground material in the forward working direction F. The discs are rotatably carried for individual rotation about a transversely extending rotational axis such that the discs act to support the attachment frame 11 in movement across the ground material.

In the illustrated arrangement, the row of cutting discs 34 is arranged in a V-shape with a leading apex 36 such that legs 37 of the V extend rearwardly and outwardly from the central apex 36 located laterally centrally of the attachment 10. The row 33 of discs 34 extends transversely beyond the sides 12 of the frame 11 as defined by the beams 14.

The cutting discs 34 are carried under the front cross-member 15 defining the front end 11B of the frame, which is fixedly attached to the beams 14 which are in turn fixedly attached to the mounting portion 19 such that the discs 34 are carried in a fixed or static predetermined configuration. The front cross-member 15 is V-shaped with a leading apex corresponding to the configuration of the row of cutting discs 34 in a V-shape. In the illustrated arrangement, the row of cutting discs is supported in a manner similarly to the Applicant's earlier U.S. Pat. No. 5,873,417 and to the related commercialized product and thus is not described in detail herein.

The configuration of the cutting discs 34 is symmetrical about a transversely-central longitudinally-extending vertical plane, with the discs 34 on either side of this central plane being dished outwardly away the plane such that an inner side 34A of each disc, which is proximal to a transverse center of the frame 11, is concave and an outer side 34B of each disc, which is distal to a transverse center of the frame, is convex. Thus the row of cutting discs acts to displace cut ground material inwardly upon movement in the forward working direction F.

Due to the symmetry of the V-shaped configuration a longitudinal location of a center of mass of the row 33 of cutting discs 34 is coincident with joints 40 between the longitudinally-extending parallel beams 14 and the V-shaped front cross-member 15, which is longitudinally spaced from the mounting portion 19 or more generally the rear end 11A of the frame by a prescribed distance of about 4.5 feet to about 5.5 feet, which distance may lie in a narrower range between about 4.75 feet and about 5.25 feet, and which in the illustrated arrangement is about 5 feet, such that the cutting discs 34, which not only act to slice the ground material but also to rollably support the frame 11 in movement across the ground material, dig into or penetrate the ground material at a suitable depth for the cutting action without impeding movement in the forward working direction F. In the illustrated arrangement, the prescribed distance is substantially defined by the length of the beams 14.

The configuration of the cutting discs 34 at the forward end 11B of the attachment causes a significant front-end weight bias for the attachment. This enables the attachment 10 to be supported on the mounting member of the prime mover by cantilever action.

Consequently, the attachment 10 includes a counterweight 45 which is supported at the rear end 11A of the frame opposite to the cutting portion 32, with a mass greater than that of the cutting portion 32 to offset the weight thereof. The counterweight mass is about 90 lbs to about 140 lbs greater than the mass of the cutting portion to provide a generally rear-end biased weight distribution of the attachment in a fore-and-aft direction, so that when the attachment 10 is detached from the prime mover the rear end 11A, along with the front end 11B which is generally heavy due to the array of cutting discs 34, acts to rest on the underlying support surface. Thus the attachment 10 is readily connectable to the prime mover 1, as the prime mover is enabled to approach the detached attachment with the mounting member 7 substantially at ground level for coupling with the mounting portion 19, and furthermore in the detached condition the rear end 11B of the attachment does not obstruct a cabin door to a skid steer when in proximity to the front of the skid steer.

The counterweight 45 is supported on an inner side of the mounting portion 19 opposite to the rearwardly-facing support surface 24 for butting engagement with the prime mover's mounting member 7. This also acts to improve a fore-aft weight distribution of the prime mover 1 which in the case of a skid steer is rear-end biased, so as to provide improved control and manipulation of the attachment, particularly in positioning of the frame 11 relative to the ground surface to adjust a penetration depth of the discs 34 in the ground material. Despite the counterweight the attachment 10 remains supportable on the mounting member 7 by simple engagement between the member 7 and the plates 26 by cantilever action to hold the components connected as the center of mass of the attachment 10 is still spaced forwardly from the mounting portion, being located relatively longitudinally centrally.

The set of cutting disks is spaced from the mounting coupling by a distance of at least 4 feet so as to provide a cantilever action of the weight of the cutting disks relative to the mounting coupling and to leave spaced for the drag.

The counterweight member is mounted on the frame at the rear end of the frame immediately adjacent the mounting coupling rather than at the disks so that the weight of the counterweight member mounted on the frame at the rear end of the frame immediately adjacent the mounting coupling and the distance of the set of cutting disks from the mounting coupling is arranged to pivot the frame so that the mounting coupling falls to the ground when released from the tractor. In this way safety is provided in that the attachment cannot suddenly and unexpectedly topple under its own weight to the ground since it is released by the tractor while at the ground because Its balance moves it to that location automatically.

The spacing of the cutting disc row 33 forwardly of the mounting portion 19 leaves a space for incorporation of a levelling drag 50, shown in FIGS. 3, 4, 9 and 10, in trailing relation to the cutting portion 32 such that the attachment is configured to both cut ground material, which action acts to displace the ground material due to the dished shape of the discs, and thereafter to level same. The levelling drag 50 is operatively supported on the frame 11 rearwardly of the cutting portion 32 and is configured for levelling the cut ground material in the forward working direction F.

In order to level the cut ground material, the levelling drag 50 comprises at a plurality of transversely extending levelling bars including bar 52, which is transversely oriented not only in relation to the frame 11 but also to the forward working direction F The bars define a generally horizontal bottom plane arranged for engaging the ground material. In the illustrated arrangement there are a plurality of such levelling bars including bars 53 and 54 in addition to that indicated at 52, each longitudinally spaced from the next. Each bar 52 through 54 defines a generally horizontal bottom plane 52A through 54A on its underside for engaging the ground material, and the planar undersides 52A-54A lie in a common plane P.

Figure 4:
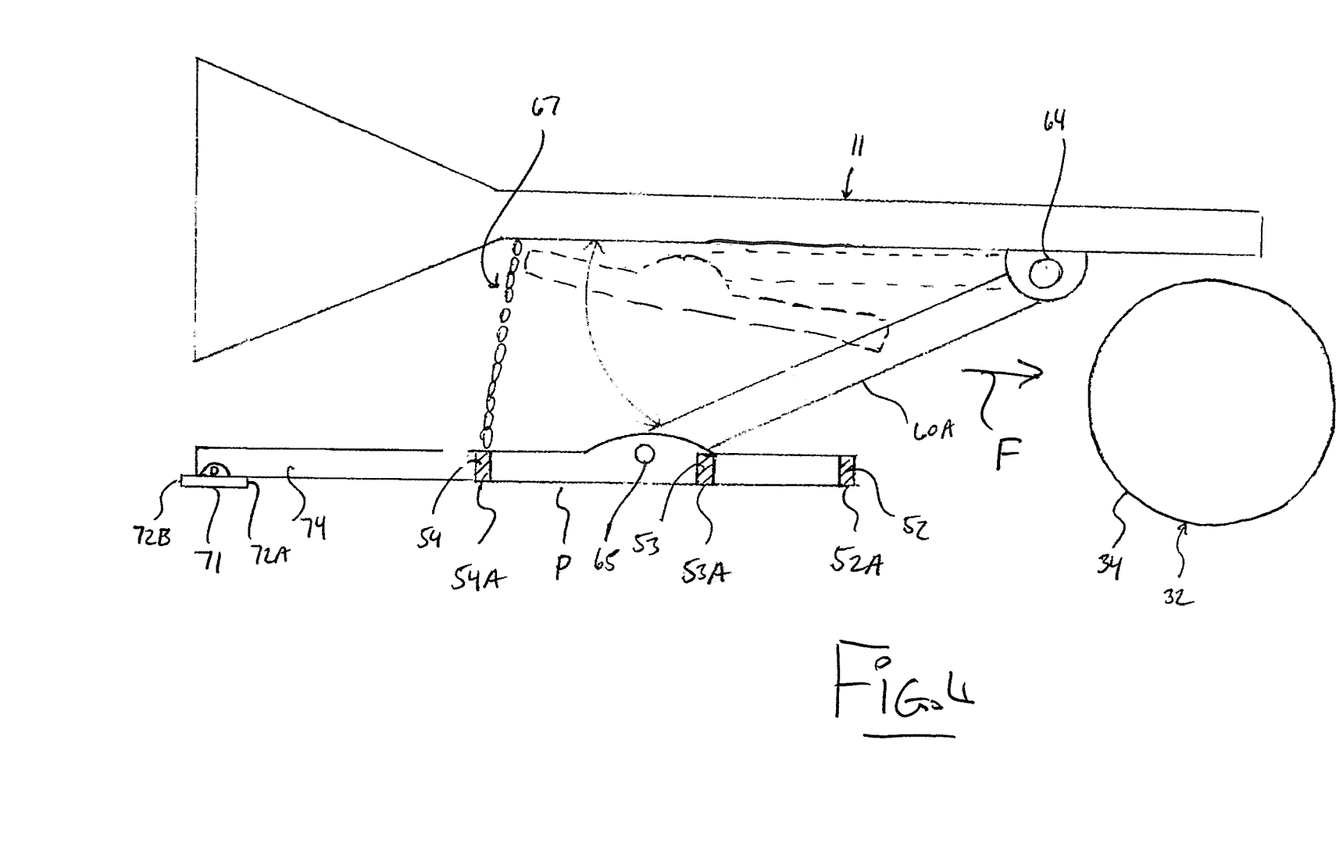
FIG. 4 is a side elevational view through the attachment of FIG. 3 including the drag bar.

A leading one of the levelling bars, that indicated at 52, is generally V-shaped in plan as shown in FIG. 4 with a leading apex so as to tend to displace the cut ground material outwardly from the center, that is in an opposite direction to that effected by cutting action of the dished cutting discs upon movement in the forward working direction. In the illustrated arrangement, a trailing one of the levelling bars adjacent to the leading one 52, which is indicated at 53, is also V-shaped with a leading apex so as to promote secondary outward spreading of the cut ground material concurrently with the levelling action. A rearmost one of the levelling bars indicated at 54 is linear and oriented perpendicularly to the forward working direction F.

The levelling bars 52, 53 and 54 are interconnected by a plurality of transversely-spaced longitudinally extending frame members 57 to form a unitary assembly, which is connected to the frame 11 by a support linkage 59. The support linkage 59 comprises a pair of arms 60A, 60B pivotally operatively connected to each of the frame 11 and the levelling drag bar assembly collectively defined by bars 52, 53 and 54 and interconnecting members 57.

The support linkage 59 is movable upwardly and downwardly relative to the frame 11 between an engaged position of the levelling drag in which the levelling bars are located at a spaced height below the frame 11 for engaging the ground material, as shown in solid line in FIG. 4, and a disengaged position of the levelling drag in which the levelling bars are located at or adjacent the frame as shown by broken line in FIG. 4.

Movement between the disengaged position and the engaged position is provided by the pivotal arms 60A, 60B which cooperatively define a pair of transversely oriented pivot axes 64, 65 at each of their ends. The pivotal interconnection between the frame 11 and the arms 60A, 60B defined by axis 64 is located forwardly of a pivotal interconnection between the arm 60A, 60B defined by axis 65 and the drag assembly such that in the engaged position the pivotal arms extend downwardly and rearwardly from the frame 11. This allows the levelling assembly to float in movement in the forward working direction F across the ground material.

It will be appreciated that the lower pivot axis 65 is positioned rearwardly of the first of the two trailing levelling bars 53 so as to be intermediate the same and the rearmost bar 54 but is closer to the former than to the latter. The rearmost levelling bar 54 is spaced further from the adjacent one of the bars 53 than the first trailing bar 53 is from the leading bar 52. The rearmost bar 54 which is linear in shape is also shorter in length than the other two bars 52 and 53 in front of same relative to the forward working direction F.

In addition to the pivotal arms 60A, 60B which carry the levelling assembly, the support linkage 59 includes a pair of flexible members 67 in the form of chains depending downwardly from the frame 11 and attached to the levelling assembly 50 rearwardly of the arms 60A, 60B. In the engaged position the chains 67 are tight so as to provide support to the levelling assembly.

The bottom pivot axis 65 permits a pitch or angle of attack of the levelling assembly to be adjusted. As such the levelling drag is configured to be movable between a flat position as shown in FIG. 4 in which the plane P of the levelling drag is generally horizontally oriented and a pitched position in which the plane P of the levelling drag bar assembly is inclined rearwardly and upwardly such that the rearmost one of the levelling bars 54 is disposed above the forwardmost or leading one of the levelling bars 52.

In the illustrated arrangement the adjustment of pitch or attack angle is provided by a trailing skid plate 71 of the levelling drag 50, which is supported to lie in the common plane P at a rearwardly spaced position behind the rearmost levelling bar 54. The skid plate 71 is movable between an inactive position in which the skid plate is parallel to the plane P of the levelling drag, as shown in FIG. 4, and an active position in which the skid plate 71 is inclined relative to the plane P of the levelling drag with a forward end 72A of the skid plate located above a rear end 72B thereof to effect movement of the levelling drag into the pitched position. The skid plate 71 is carried at its trailing position by a longitudinally extending carrier member 74 which is connected outwardly of the frame 11 on one side of the levelling drag.

Figure 10:
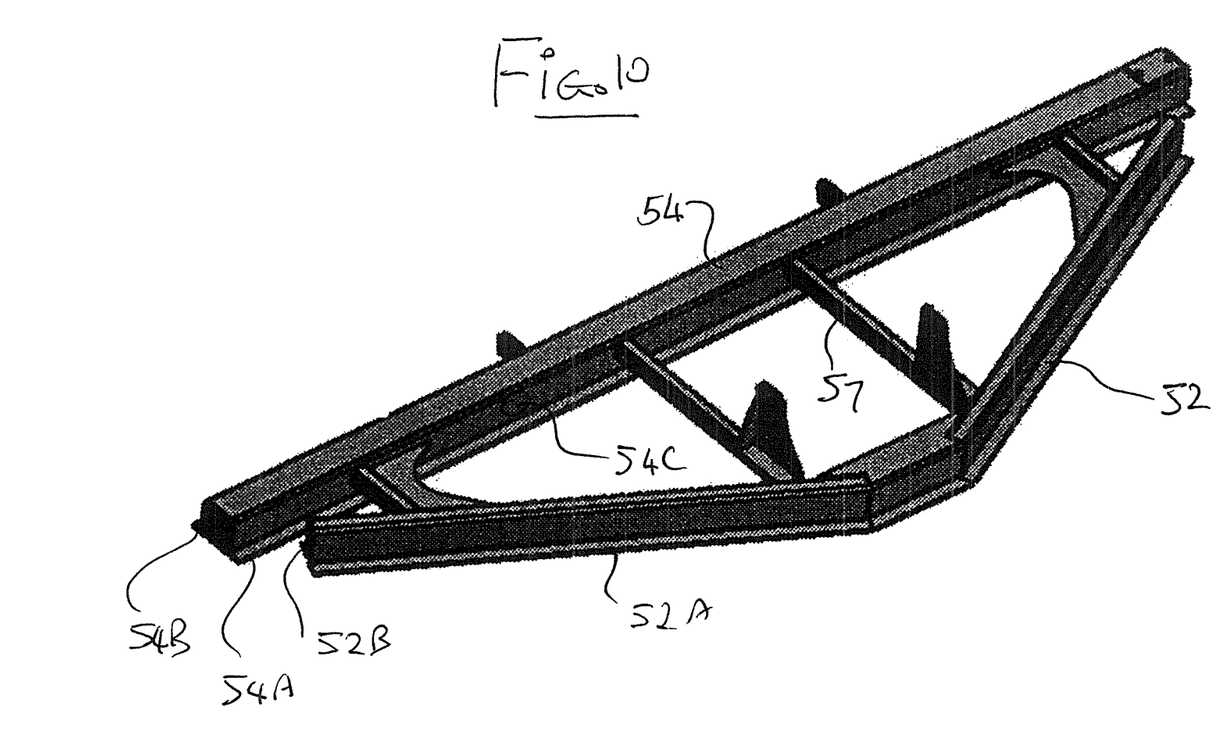
FIG. 10 is an isometric view of the drag bar of FIGS. 3 and 4 separated from the attachment.

As shown in FIG. 10, the levelling drag comprises at least one bar and typically both bars having bottom cutting flanges 52A, 52B and 54A, 54B extending forwardly and rearwardiy from front and rear faces of the bar for engaging and cutting the ground. Theus each bar is typically a rectangular tube with a plate welded across the bottom face to form the flanges extending forward and rearwardiy to act in cutting the ground churned up by the disks as the drag moves both forwardly and rearwardly.

As shown in FIG. 10, the levelling drag comprises at least one bar 54 having an opening 54C which allows the bar to be filled with a filler material such as sand or water for increase weight.

As shown previously, the levelling drag can carried on cables so as to engage the ground under its own weight and so as to allow movements forward, rearwardiy and to the sides to an extent limited by the cables. Typically six cables can be used to confine the drag to a location behind the disks and well forward of the tractor while allowing the movements under its own forces from the ground to run over eh ground and provide the smoothing action.

Figure 5:
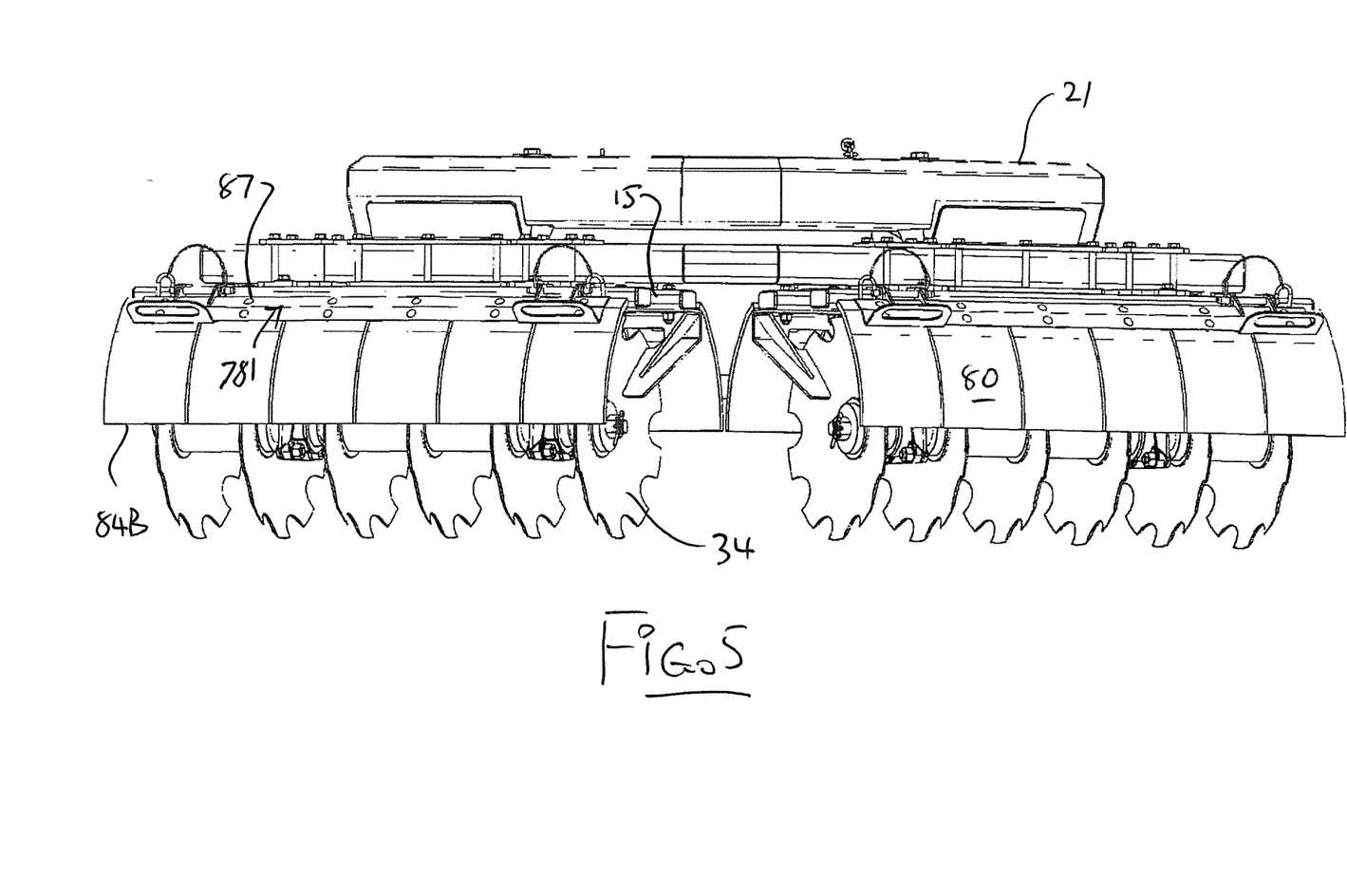
FIG. 5 is a rear elevational view of the attachment of FIG. 1 with a first variant of protective shields.
Figure 6:
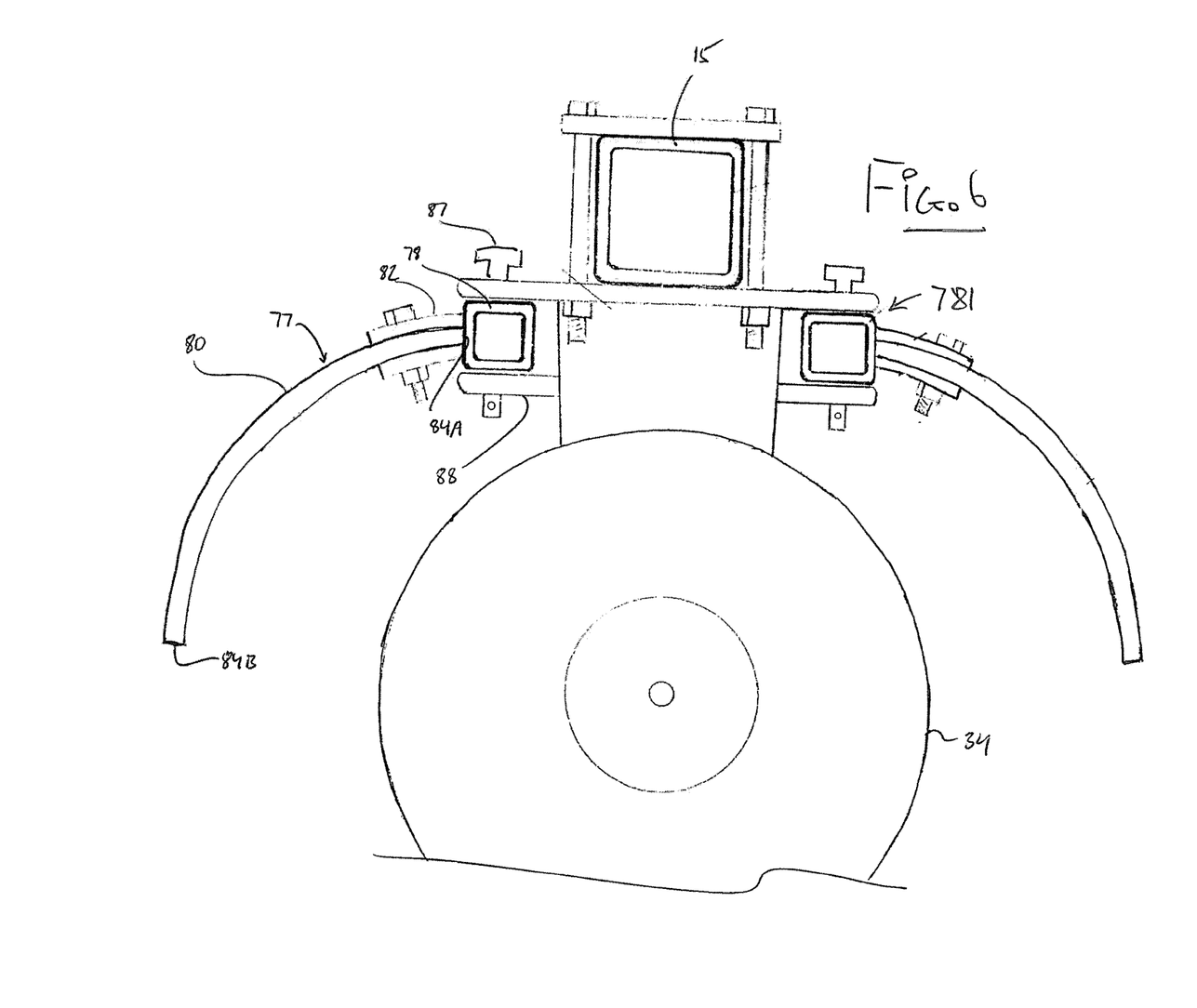
FIG. 6 is a side view schematically showing a cutting portion of the attachment of FIG. 1 with a second variant of protective shields.

To protect users or bystanders in the vicinity of the equipment from injury due to the cutting discs 34, the cutting portion 32 includes a plurality of shields 77, best shown in FIGS. 2, 5 and 6, supported above the cutting discs 34 in spaced relation thereto and arranged to extend outwardly from the row 33 to cover upper quadrant portions of the cutting discs. There are provided separate shields 77 for each leg 37 of the V-shaped row and front and rear shields for covering the two upper quadrants of the discs in that leg.

Figure 7:
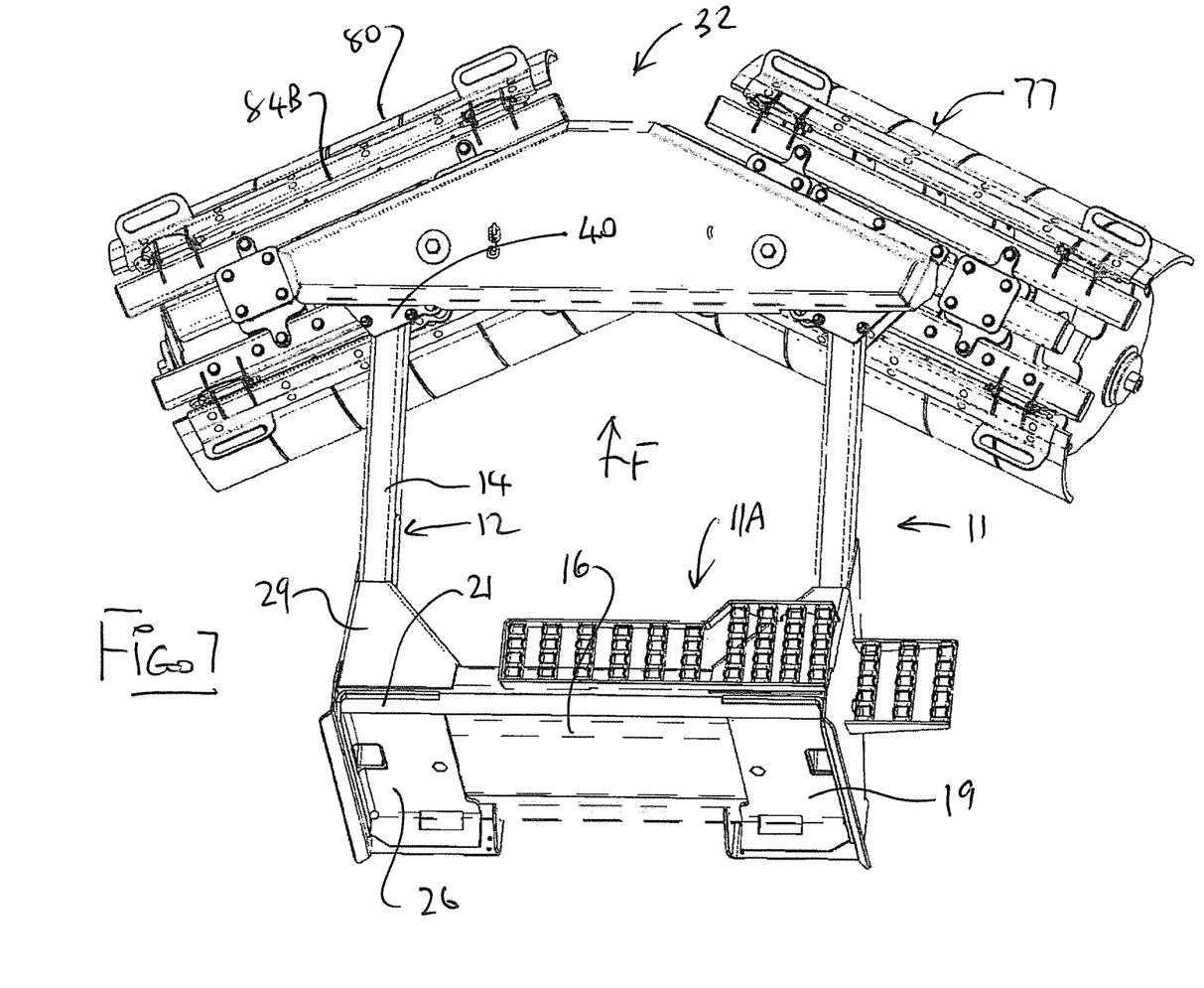
FIG. 7 is another isometric view from the top and front of the attachment with the variant of shield of FIG. 5.
Figure 8:
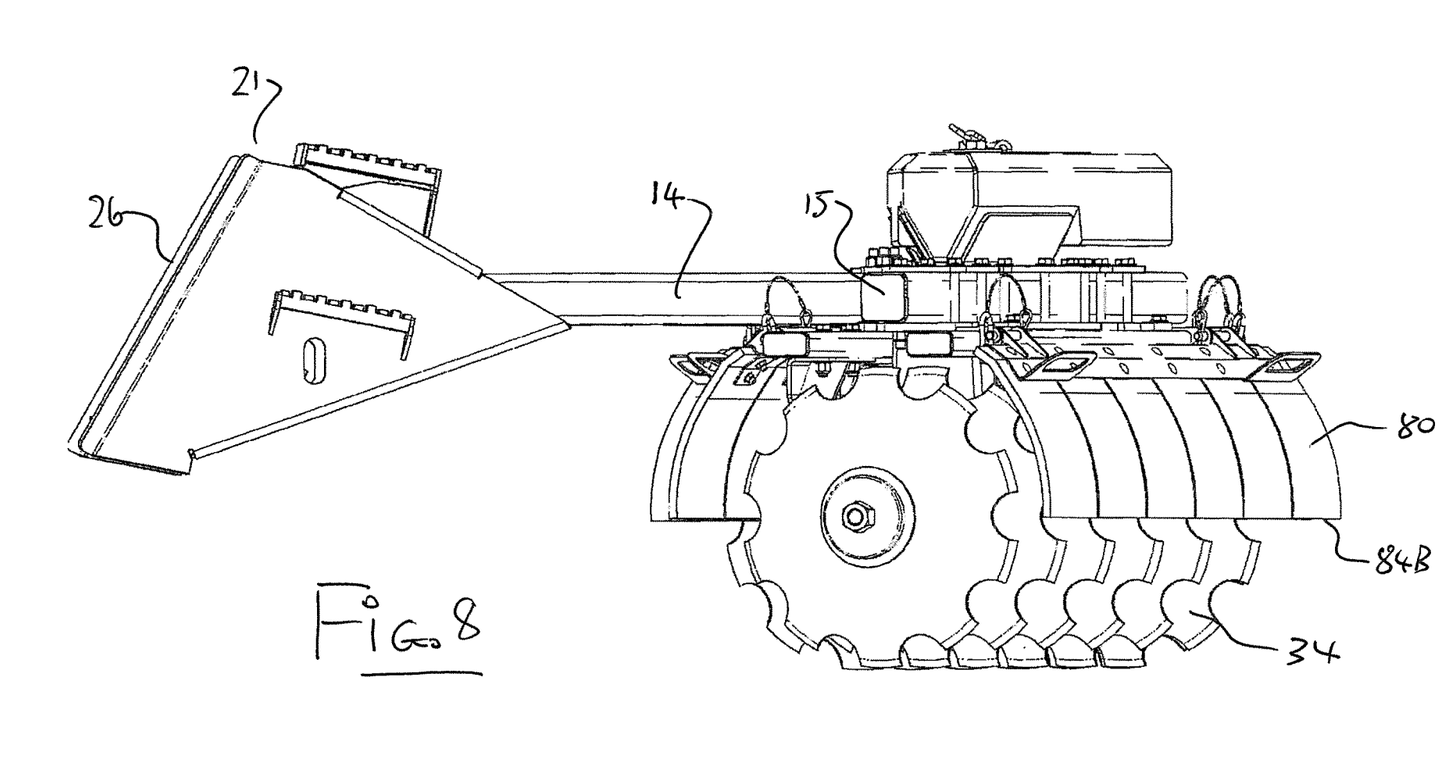
FIG. 8 is yet another isometric view from one side of the attachment as shown in FIG. 5.
Figure 9:
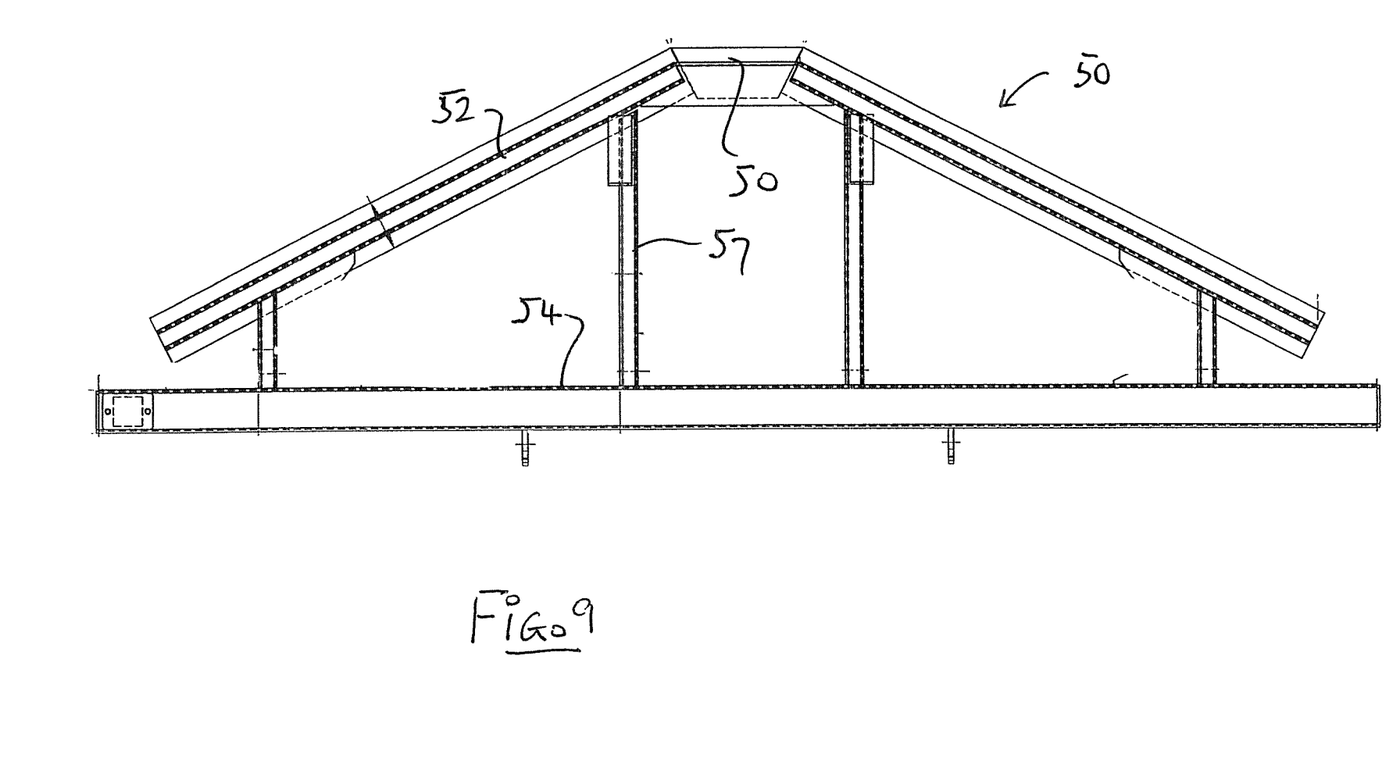
FIG. 9 is a plan view of the drag bar of FIGS. 3 and 4 separated from the attachment.

Referring to FIGS. 5 to 7 which show two arrangements of shield, each shield 77 generally comprises a carrier member 78 in the form of a tube which is supported in support channels 781 in fixed relation below the front cross member 15 of the frame 11 and in longitudinally spaced parallel relation thereto. Thus each shield 77 is located over respective ones of the two upper quadrants of any one of the cutting discs thereunder. The shield forms a semi-rigid resilient arcuate panel 80 in the form of a rubber flap for covering the discs; and an interconnecting mounting member 82 in the form of a channel mounted on the tube 78 receiving the shield member.

In the arrangement of FIGS. 5 and 7 the mounting member 82 is hingedly connected to the carrier member 78 and in the arrangement of FIG. 6 this interconnection is fixed or rigid.

When the interconnection is pivotal as in FIGS. 5 and 7 each shield 77 is movable between a working position in which the shield extends outwardly and downwardly from the frame 11, specifically the cross member 15, over the cutting disc 34 thereunder, as shown in FIG. 5, and a raised position in which the shield extends generally upwardly 7.

Each shield member 80 is arcuate between an upper end wherein the channel and the support surface provide a mounting which allows pivotal movement of the attachment about the axis of the channel which is coupled in generally fixed position to the frame 11, regardless of whether the shields are pivotally movable or fixed in a working position when mounted, and a lower free end 84B in a manner corresponding to a circumference of the cutting disc thereunder. The whole of the shield member is spaced from its respective disk 34.

The panel forming each shield may be separate from the adjacent shields so as to cover only one of the disks or they may be combined as a common element covering all disks of the two sections. When separate, each shield 77 can be mounted to the frame independently of the other shields such as by pins 87 through a coupling element in the general form of a clevis 88 so as to be removable for example for replacement. Each shield is removable by a release mechanism provided by the pins 87 to allow the shield and its mounting tube 74 to be fully removed for use without the shields in situation such as very rough terrain where the shields cannot remain in place.

This provides a simple arrangement for a ground-cutting implement in which the row of cutting discs is arranged at a suitably spaced distance which provides effective and controllable cutting action. The single row of cutting discs is spaced from the mounting portion at a prescribed distance such that cantilever action of the row of discs about the mounting member of the prime mover is sufficient to penetrate the ground material at a suitable depth for cutting action without impeding the forward movement of the prime mover. If the single row of cutting discs is located closer to the mounting portion than the prescribed distance, a weight of the front end of the attachment causes the cutting discs to dig too deeply into the ground material thereby impeding movement of the prime mover in the forward working direction. If the single row of cutting discs is located farther from the mounting portion than the prescribed distance, the weight of the front end of the attachment is insufficient to effect cutting engagement of the discs with the ground material.

The invention claimed is:

1. A disker attachment for mounting on a skid-steer tractor to cut ground, the skid-steer tractor having:
   a tractor frame having a front end, a rear end, and transversely opposite sides;
   ground engaging members supported on the sides of the tractor frame and arranged for moving the tractor frame across a support surface in a forward working direction;
   a pair of pivotal arms each supported on a different one of the sides of the tractor frame for upward and downward movement relative to the tractor frame about a transversely oriented pivot axis, the pivotal arms extending forwardly from rear ends at which the pivot axis is located to front ends of the pivotal arms located at or adjacent the front end of the tractor frame; and
   a mounting member supported between the front ends of the pivotal arms relative to a transverse direction of the tractor frame in a manner for pivotal movement about a generally horizontal axis extending between said front ends, the mounting member being configured to removably receive a work tool in a manner such that the work tool is movable therewith;
   the disker attachment comprising:
   a disker frame having a forward end and a longitudinally spaced rear end;
   a mounting coupling at the rear end of the disker frame configured for coupling to the mounting member of the skid-steer tractor;
   a set of cutting disks mounted at the forward end of the disker frame in forwardly spaced relation to the mounting coupling;
   the set of cutting disks comprising only a single transversely-extending row of cutting discs across the forward end of the disker frame;
   the set of cutting disks comprising two sections arranged in a V-shape with an apex of the V-shape being located at the front and defining two rotation axes of the row diverging rearward from the apex, with each of the two sections of disks rotating about a respective rotation axis;
   the set of cutting disks being fixed at the V-shape and arranged so as to carry cut material in an inward direction toward a center line of the disker frame.

2. The attachment according to claim 1 wherein the set of cutting disks is spaced from the mounting coupling by a distance of at least 4 feet so as to provide a cantilever action of a weight of the cutting disks relative to the mounting coupling.

3. The attachment according to claim 1 including a counterweight member mounted on the disker frame at the rear end of the disker frame immediately adjacent the mounting coupling.

4. The attachment according to claim 3 wherein a weight of the counterweight member mounted on the disker frame at the rear end of the disker frame immediately adjacent the mounting coupling and the distance of the set of cutting disks from the mounting coupling is arranged to pivot the disker frame so that the mounting coupling falls to the ground when released from the skid-steer tractor.

5. The attachment according to claim 1 further including a levelling drag operatively supported on the disker frame rearwardly of the set of cutting disks and configured for levelling cut ground material behind the cutting disks when moving in the forward working direction.

6. The attachment according to claim 5 wherein the levelling drag comprises a transversely extending levelling bar defining a generally horizontal bottom plane and arranged for engaging the ground material, which is generally V-shaped with a leading apex so as to displace the cut ground material in an opposite direction to that effected by cutting action of the cutting discs upon movement in the forward working direction.

7. The attachment according to claim 5 wherein the levelling drag comprises a plurality of transversely extending, longitudinally spaced levelling bars each lying in a common generally horizontal bottom plane and arranged for engaging the ground material.

8. The attachment according to claim 5 wherein the levelling drag comprises at least one transversely extending levelling bar arranged to be oriented transversely to the forward working direction and a support linkage interconnecting the at least one levelling bar and the disker frame which is movable upwardly and downwardly relative to the disker frame between a disengaged position in which the at least one levelling bar is located at or adjacent the disker frame and an engaged position in which the at least one levelling bar is located at a spaced height below the disker frame for engaging the ground material.

9. The attachment according to claim 5 wherein the levelling drag comprises at least one levelling bar having bottom cutting flanges extending forwardly and rearwardly from front and rear faces of the levelling bar for engaging and cutting the ground material.

10. The attachment according to claim 5 wherein the levelling drag comprises at least one levelling bar having an opening which allows the levelling bar to be filled with a filler material for increased weight.

11. The attachment according to claim 5 wherein the levelling drag is carried on cables so as to engage the ground material under its own weight and so as to allow movements forward, rearwardly and to the sides to an extent limited by the cables.

12. The attachment according to claim 5 wherein the levelling drag comprises a plurality of levelling bars and is configured to be movable between a flat position in which a common generally horizontal bottom plane of the levelling drag is generally horizontally oriented and a pitched position in which the common generally horizontal bottom plane of the levelling drag is inclined rearwardly and upwardly such that a rearmost one of the levelling bars is disposed above a forwardmost one of the levelling bars.

13. The attachment according to claim 12 wherein the levelling drag includes a trailing skid plate supported to lie in the common generally horizontal bottom plane at a rearwardly spaced position behind the rearmost one of the levelling bars, the skid plate being movable between an inactive position in which the skid plate is parallel to the common generally horizontal bottom plane of the levelling drag and an active position in which the skid plate is inclined relative to the common generally horizontal bottom plane of the levelling drag with a forward end of the skid plate located above a rear end thereof to effect movement of the levelling drag into the pitched position.

14. A disker attachment for mounting on a skid-steer tractor to cut ground, the skid-steer tractor having:
   a tractor frame having a front end, a rear end, and transversely opposite sides;
   ground engaging members supported on the sides of the tractor frame and arranged for moving the tractor frame across a support surface in a forward working direction;
   a pair of pivotal arms each supported on a different one of the sides of the tractor frame for upward and downward movement relative to the tractor frame about a transversely oriented pivot axis, the pivotal arms extending forwardly from rear ends at which the pivot axis is located to front ends of the pivotal arms located at or adjacent the front end of the tractor frame; and
   a mounting member supported between the front ends of the pivotal arms relative to a transverse direction of the tractor frame in a manner for pivotal movement about a generally horizontal axis extending between said front ends, the mounting member being configured to removably receive a work tool in a manner such that the work tool is movable therewith;
   the disker attachment comprising:
   a disker frame having a forward end and a longitudinally spaced rear end;
   a mounting coupling at the rear end of the disker frame configured for coupling to the mounting member of the skid-steer tractor;
   a set of cutting disks mounted at the forward front end of the disker frame in forwardly spaced relation to the mounting coupling;
   the set of cutting disks comprising a transversely-extending row of cutting discs across the forward end of the disker frame;
   and a levelling drag operatively supported on the disker frame rearwardly of the set of cutting disks and configured for levelling the cut ground material behind the cutting disks when moving in the forward working direction.

15. The attachment according to claim 14 wherein the levelling drag comprises a transversely extending levelling bar defining a generally horizontal bottom plane and arranged for engaging the ground material, which is generally V-shaped with a leading apex so as to displace the cut ground material in an opposite direction to that effected by cutting action of the cutting discs upon movement in the forward working direction.

16. The attachment according to claim 14 wherein the levelling drag comprises a plurality of transversely extending, longitudinally spaced levelling bars each lying in a common generally horizontal bottom plane and arranged for engaging the ground material.

17. The attachment according to claim 14 wherein the levelling drag comprises at least one transversely extending levelling bar arranged to be oriented transversely to the forward working direction and a support linkage interconnecting the at least one levelling bar and the disker frame which is movable upwardly and downwardly relative to the disker frame between a disengaged position in which the at least one levelling bar is located at or adjacent the disker frame and an engaged position in which the at least one levelling bar is located at a spaced height below the disker frame for engaging the ground material.

18. The attachment according to claim 14 wherein the levelling drag comprises at least one levelling bar having bottom cutting flanges extending forwardly and rearwardly from front and rear faces of the levelling bar for engaging and cutting the ground material.

19. The attachment according to claim 14 wherein the levelling drag comprises at least one levelling bar having an opening which allows the levelling bar to be filled with a filler material for increased weight.

20. The attachment according to claim 14 wherein the levelling drag is carried on cables so as to engage the ground material under its own weight and so as to allow movements forward, rearwardly and to the sides to an extent limited by the cables.

21. The attachment according to claim 14 wherein the levelling drag comprises a plurality of levelling bars and is configured to be movable between a flat position in which a common generally horizontal bottom plane of the levelling drag is generally horizontally oriented and a pitched position in which the common generally horizontal bottom plane of the levelling drag is inclined rearwardly and upwardly such that a rearmost one of the levelling bars is disposed above a forwardmost one of the levelling bars.

22. The attachment according to claim 21 wherein the levelling drag includes a trailing skid plate supported to lie in the common generally horizontal bottom plane at a rearwardly spaced position behind the rearmost one of the levelling bars, the skid plate being movable between an inactive position in which the skid plate is parallel to the common generally horizontal bottom plane of the levelling drag and an active position in which the skid plate is inclined relative to the common generally horizontal bottom plane of the levelling drag with a forward end of the skid plate located above a rear end thereof to effect movement of the levelling drag into the pitched position.

23. A disker attachment for mounting on a skid-steer tractor to cut ground, the skid-steer tractor having:
   a tractor frame having a front end, a rear end, and transversely opposite sides;
   ground engaging members supported on the sides of the tractor frame and arranged for moving the tractor frame across a support surface in a forward working direction;
   a pair of pivotal arms each supported on a different one of the sides of the tractor frame for upward and downward movement relative to the tractor frame about a transversely oriented pivot axis, the pivotal arms extending forwardly from rear ends at which the pivot axis is located to front ends of the pivotal arms located at or adjacent the front end of the tractor frame; and
   a mounting member supported between the front ends of the pivotal arms relative to a transverse direction of the tractor frame in a manner for pivotal movement about a generally horizontal axis extending between said front ends, the mounting member being configured to removably receive a work tool in a manner such that the work tool is movable therewith;
   the disker attachment comprising:
   a disker frame having a forward end and a longitudinally spaced rear end;
   a mounting coupling at the rear end of the disker frame configured for coupling to the mounting member of the skid-steer tractor;

a set of cutting disks mounted at the forward end of the disker frame in forwardly spaced relation to the mounting coupling and engaging the ground in front of the skid-steer tractor;

the set of cutting disks comprising a transversely-extending row of cutting discs across the forward end of the disker frame;

a counterweight member added to and mounted on the disker frame at the rear end of the disker frame immediately adjacent the mounting coupling;

wherein a weight of the counterweight member at its mounting position on the disker frame at the rear end of the disker frame immediately adjacent the mounting coupling and a distance of the set of cutting disks from the mounting coupling is arranged to pivot the disker frame relative to the cutting disks on the ground so that the mounting coupling falls to the ground when released from the skid-steer tractor.

24. An attachment for mounting on a skid-steer tractor to cut and level ground, the skid-steer tractor having:

a tractor frame having a front end, a rear end, and transversely opposite sides;

ground engaging members supported on the sides of the tractor frame and arranged for moving the tractor frame across a support surface in a forward working direction;

a pair of pivotal arms each supported on a different one of the sides of the tractor frame for upward and downward movement relative to the tractor frame about a transversely oriented pivot axis, the pivotal arms extending forwardly from rear ends at which the pivot axis is located to front ends of the pivotal arms located at or adjacent the front end of the tractor frame; and a mounting member supported between the front ends of the pivotal arms relative to a transverse direction of the tractor frame in a manner for pivotal movement about a generally horizontal axis extending between said front ends, the mounting member being configured to removably receive a work tool in a manner such that the work tool is movable therewith;

the attachment comprising:

an attachment frame having a forward end and a longitudinally spaced rear end;

a mounting coupling at the rear end of the attachment frame configured for coupling to the mounting member of the skid-steer tractor;

a transversely-extending row of cutting members mounted at the forward end of the attachment frame in forwardly spaced relation to the mounting coupling and engaging the ground in front of the skid-steer tractor;

a levelling drag bar operatively supported on the attachment frame rearwardly of the set of cutting members and configured for levelling the cut ground material behind the cutting members when moving in the forward working direction;

a counterweight member added to and mounted on the attachment frame at the rear end of the attachment frame immediately adjacent the mounting coupling;

wherein a weight of the counterweight member at its mounting position on the attachment frame at the rear end of the attachment frame immediately adjacent the mounting coupling and a distance of the set of cutting members from the mounting coupling is arranged to pivot the attachment frame relative to the cutting members on the ground so that the mounting coupling falls to the ground when released from the skid-steer tractor.

* * * * *